United States Patent

Korff

[11] Patent Number: 5,090,522
[45] Date of Patent: Feb. 25, 1992

[54] BRAKE ACTUATING APPARATUS

[75] Inventor: Roy D. Korff, Elk Grove Village, Ill.

[73] Assignee: Duchossois Industries, Inc., Elmhurst, Ill.

[21] Appl. No.: 572,845

[22] Filed: Aug. 24, 1990

[51] Int. Cl.⁵ .................... F16D 51/16; B60T 13/04
[52] U.S. Cl. .................... 188/166; 188/75; 188/171
[58] Field of Search .................... 188/75, 76, 67, 166, 188/171

[56] References Cited

U.S. PATENT DOCUMENTS

| | | |
|---|---|---|
| 461,052 | 10/1891 | Shaw . |
| 1,702,514 | 2/1929 | Lindquist et al. . |
| 2,214,807 | 9/1940 | Buckley .................... 192/2 |
| 2,293,375 | 8/1942 | Wigglesworth .................... 51/237 |
| 3,200,910 | 8/1965 | Cunningham et al. .................... 188/85 |
| 3,596,739 | 8/1971 | Ramsey et al. .................... 188/171 |
| 3,986,586 | 10/1976 | Mauger et al. .................... 188/264 R |
| 4,132,292 | 1/1979 | Dufresne .................... 188/171 |
| 4,623,191 | 11/1986 | Blume et al. .................... 279/110 |
| 4,700,814 | 10/1987 | Mitchell .................... 188/67 |
| 4,773,210 | 9/1988 | Landwehrkamp et al. .................... 57/406 |
| 4,787,484 | 11/1988 | Webb .................... 188/171 |

FOREIGN PATENT DOCUMENTS 563776  4/1939  United Kingdom .................... 188/171

*Primary Examiner*—Robert J. Oberleitner
*Assistant Examiner*—Chris Schwartz
*Attorney, Agent, or Firm*—Fitch, Even, Tabin & Flannery

[57] ABSTRACT

An arrangement for automatically engaging and disengaging a brake on rotating apparatus comprising a rotatable brake drum and a pair of brake shoes pivotally mounted for engagement with the drum. Free ends of the brake shoes are urged together by spring forces bringing the brake shoes into braking engagement with the drum. A brake release mechanisms includes a pivoted release member with a cone-shaped stud slidably connected thereto. The brake shoes are disengaged by rotating the release member which forces the stud between the brake shoe free ends and separates the brake shoes from the drum. The conical stud and its slidable connection to the pivoted release member simplifies assembly and maintenance of the arrangement.

9 Claims, 2 Drawing Sheets

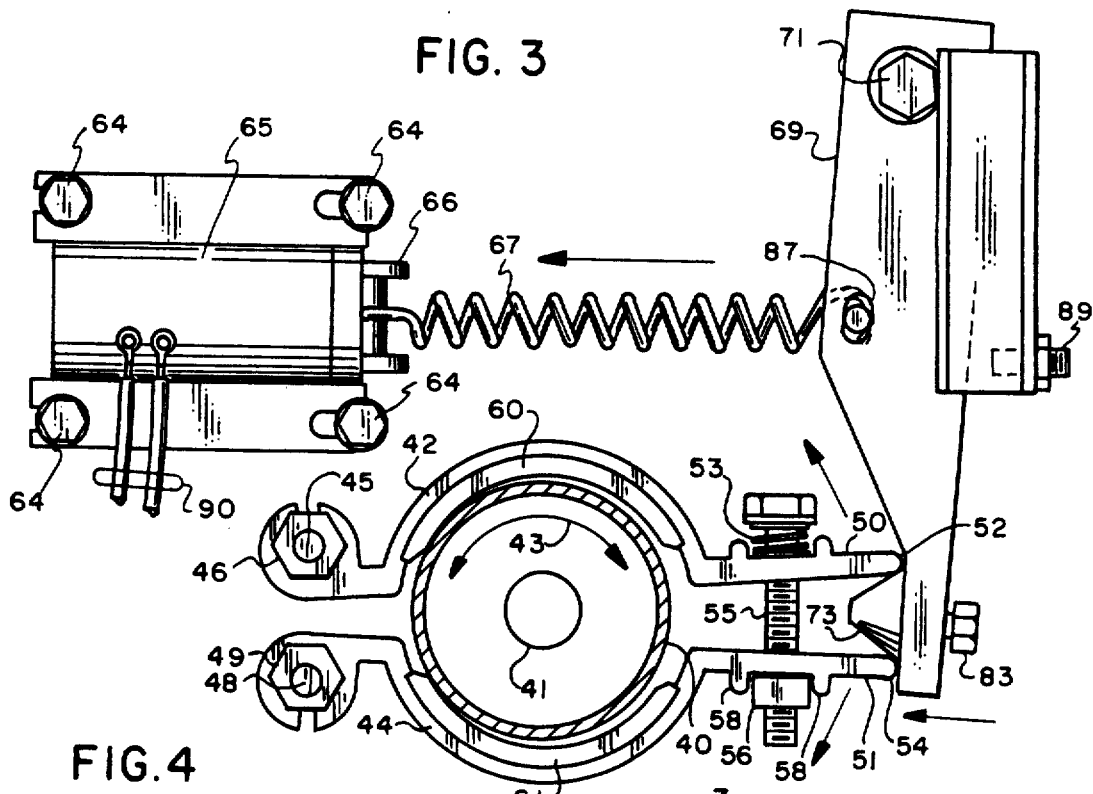
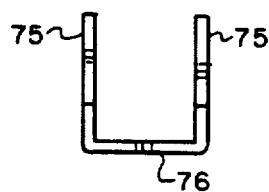
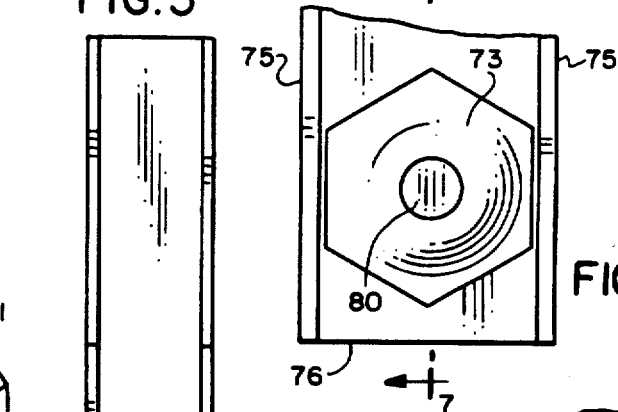
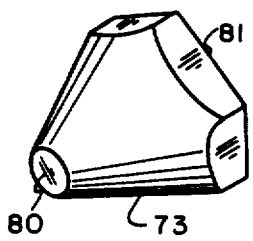
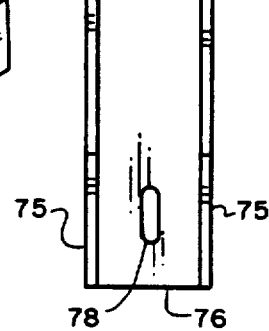
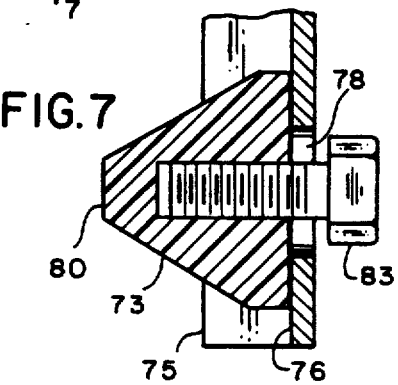

BRAKE ACTUATING APPARATUS

This invention relates to braking apparatus for rotating machinery, and more particularly, to self-aligning components for such apparatus to aid in the maintenance and assembly thereof.

Much of today's industrial and home equipment is driven by a prime mover such as an electric motor which delivers power by means of a rotating shaft. Energizing the motor causes the shaft to rotate so that work can be performed. When the motor is de-energized the shaft will continue to rotate until the inertia in the motor and shaft has been dissipated in friction or in performing work.

In certain situations, such as where precision work is being done, or where limits of motion should not be exceeded, it is desirable to stop the shaft from rotating relatively rapidly upon de-energizing the motor. For example, it is desirable to rapidly stop the shaft of a motor lowering a garage door when a sensor detects an obstruction.

Arrangements for applying a brake to rotating equipment when the motor is de-energized, and for releasing the brake when the motor is energized are known in the art. One early braking apparatus is shown and described in U.S. Pat. No. 1,702,514 to D.L. Lindquist, et al. Lindquist's arrangement includes a brake drum and a pair of pivoted brake arms with brake linings affixed thereto. When this arrangement is de-energized, electric power to the driving electrical motor is removed, and the linings of the brake arms are urged into braking relationship with the drum by a pair of springs. When electrical power is applied to the motor, electrical power is also applied to drive a wedge between free ends of the pivoted brake arms causing them to pivot away from the drum. The rotation releases the brake linings from the drum, freeing the shaft to rotate. When the arrangement is again electrically de-energized, the wedge is withdrawn from between the pivotable brake arms, which again engage the brake drum, rapidly stopping rotation of the motor shaft.

It is expected that the brake linings will wear with use and that the alignment of major components will change as they age. Accordingly, adjustment devices are provided in prior systems to permit assembly and maintenance personnel to align the apparatus and compensate for changes occurring during use. Typically, the adjustment devices allow changes in the shape and spacing of the free ends of the pivotable brake arms so that the fixed movement of the wedge therebetween is sufficient to release both brake linings when a brake releasing force is applied.

After proper adjustment of the adjustment devices, such brake mechanisms provide proper operation of the braking assembly. However, to achieve proper operation, adjustments must be made at the time of assembly and during the life of the apparatus. These labor intensive adjustments add time and cost to the assembly and operation of the equipment.

U.S. Pat. No. 4,787,484 to D.J. Webb discloses an arrangement for avoiding maintenance on an automatic braking assembly which includes an automatically readjusting mechanism. The Webb apparatus continually adjusts the lengths of certain connecting links to compensate for brake lining wear. The self-compensation of Webb greatly increases the complexity and initial expense of employing automatic braking systems.

A need exists for an automatic braking apparatus for us with rotating machinery which does not add to the complexity of the apparatus or increase its assembly and maintenance costs.

SUMMARY OF THE INVENTION

A brake actuating apparatus in accordance with the present invention includes a rotatable member such as the shaft of a motor or a drum attached thereto and a pair of brake shoes, each pivoted at one end, which are urged into braking engagement with the rotatable member. A free end of each brake shoe is spaced apart from the free end of the other when the brake shoes are engaged. A movable brake release mounting and a stud slidably connected to the mounting are used to disengage the brake shoes from the rotatable member. The brake controlling stud has an apex narrower than a space between the spaced apart free ends of the brake shoes, a base wider than the space between those spaced apart free ends and is positioned so that the apex is between the brake shoe free ends. The brakes are disengaged by moving the brake release member toward the spaced apart brake shoe free ends, thereby forcing the brake-controlling stud between the free ends to counteract the force urging the brake shoes together. Such counteraction lifts the brake shoes from the rotatable member to disengage the brakes. The slidable connection between the stud and the break release mounting allows the stud to self-center between the brake shoe free ends when a force is applied by the brake release mounting. The use of such a slidable connection simplifies assembly in that no assembly adjustment of the stud or the brake shoe free ends is necessary. Also, during the life of the brake actuating mechanism any changes in alignment caused by wear are compensated for by changes in the location of the stud along the sliding connection to the brake release mounting.

The brake release mounting has an elongated aperture disposed therein through which the stud is loosely connected. The loose connection is formed by a bolt which extends from one side of the brake release mounting through the elongated aperture and is screwed into a tapped hole along the major access of the stud.

In the Preferred Embodiment of the present invention the brake release mounting comprises a pivoted brake control member to which the stud is attached and a solenoid for pivoting the brake control member to force the stud between the ends of the brake shoes. Advantageously, the stud forms the frustum of a right circular cone and the solenoid is connected to the pivoted brake control member by a spring having sufficient tension to cause the stud to disengage the brake shoes when the solenoid is energized.

BRIEF DESCRIPTION OF THE DRAWINGS

FIG. 3, similar to FIG. 2, illustrates the device in its n condition;

FIG. 4 is a bottom elevational view of a pivotable lever device of FIG. 2;

FIG. 5 is a side elevational view of the actuation lever of FIG. 3;

FIG. 6, similar to FIG. 5, illustrates one end of the lever holding a stud for moving the brake shoes toward their non-braking condition;

FIG. 7 is a sectional view taken generally along line 7—7 of FIG. 6; and

FIG. 8 is a perspective view of the stud of FIG. 7.

Corresponding reference characters indicate corresponding components throughout the several views of the drawings.

DETAILED DESCRIPTION OF THE PREFERRED EMBODIMENT

Figure 1:
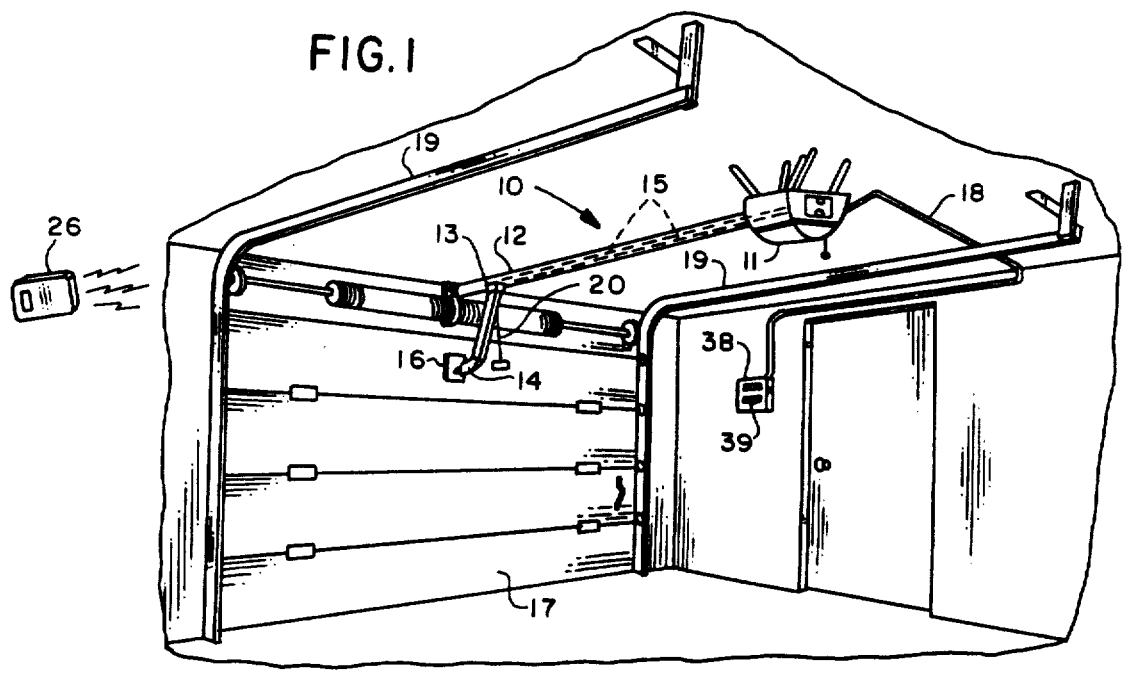
FIG. 1 is a perspective view showing a garage door operator including a brake activation device embodying various features of the present invention.

FIG. 1 illustrates a garage door operator 10 mounted to the ceiling of a garage and connected to operate a door 17. Garage door operator 10 has a head end unit 11 which is supported from the ceiling and includes a motor (not shown) which drives a suitable chain 15 to which a trolley 13 is attached so that it moves along rail 12. The trolley 13 has a release cord 20 and pivotally carries a lever arm 14, which is attached to a bracket 16 mounted to the door, so as to raise and open it by pulling it along conventional rails 19. Similarly, operator 11 lowers the door by moving trolley 13 away from header unit 11 until the door has achieved the closed position.

Header unit 11 includes an operating mechanism which energizes the motor to open and close the door. The operating mechanism is actuated over a conductor 18 from a control unit 38. Control unit 38 actuates header unit 11 in response to an operate switch 39 on the control unit 38 and in response to signals from a remote transmitter 26.

Header unit 11 further includes an upper limit switch (not shown) and a lower limit switch (not shown) which control the upper and lower limit of door travel respectively. When either of these limits is reached, the motor of head unit 11 is de-energized to stop further door motion. Similarly, head unit 11 may include an obstruction-sensing switch, which senses when the door strikes an object. Power is also removed from the motor in response to the obstruction sensing switch. It is desirable to stop door motion rapidly in response to either of the limit switches or the obstruction sensing switch and to hold the position of the door upon stopping. The present embodiment includes a braking apparatus in head unit 11 to stop motor shaft rotation.

Figure 2:
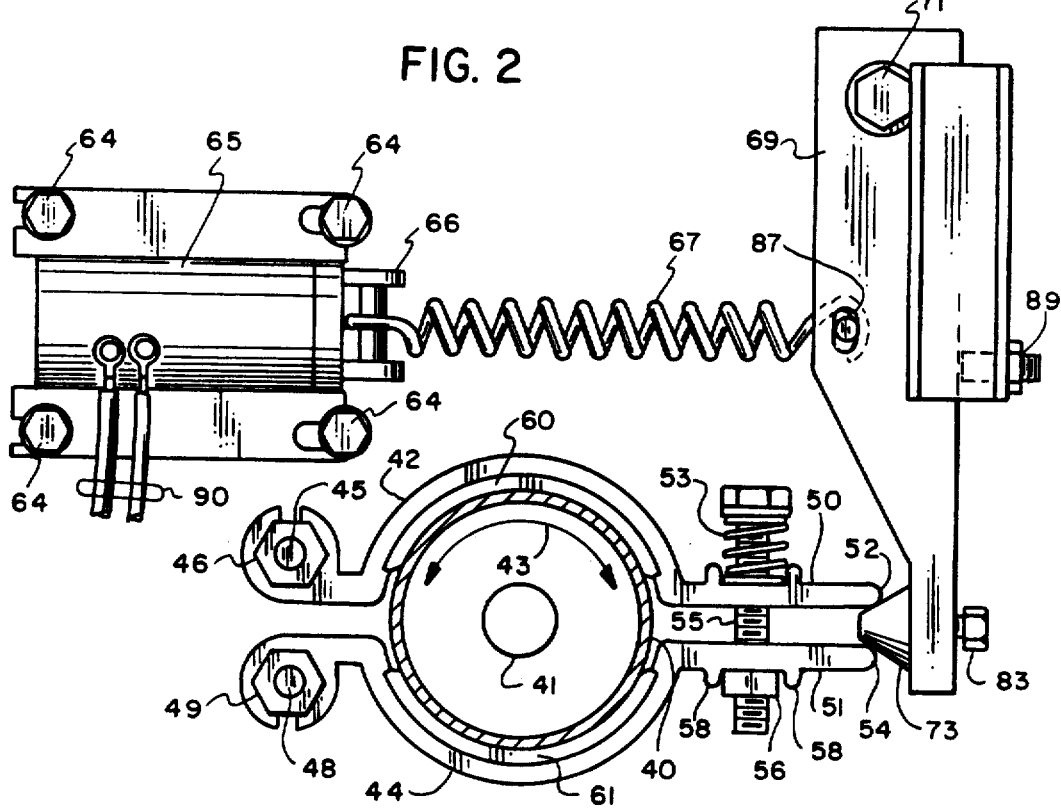
FIG. 2 is a front elevational view of components of the header unit of the door operator including those of the brake activation device shown in its braking condition with certain components thereof shown in section.

FIG. 2 shows the components of the braking apparatus contained by head unit 11, which apparatus is used to apply brakes to the rotation shaft of the driving motor whenever that motor is de-energized. FIG. 2 includes a brake drum 40 which is directly attached to a rotating shaft 41 of the driving motor, and rotates whenever that motor is in motion. The directions of drum rotation are shown by a two-headed arrow 43. Two brake shoes 42 and 44, and their respective brake linings 60 and 61, are shown in FIG. 2. Brake shoe 42 pivots from a shaft 45 and is held in place on shaft 45 by nut 46. Similarly, brake shoe 44 is attached to a pivot shaft 48 by a nut 49. Brake shoes 42 and 44 independently pivot about their respective pivot shafts 45 and 48 in a plane parallel to the plane rotation of drum 40.

The brake shoes 42 and 44 extend around the perimeter of drum 40 on opposite sides and terminate at brake shoe actuation arms 50 and 51, respectively. Arms 50 and 51 are rounded at ends 52 and 54 to slidably engage a stud 73. Brake shoe actuation arms 50 and 51 are urged together by the operation of a spring 53 around one end of a bolt 55 which extends through both actuation arms 50 and 51 and is secured at actuation end 51 by a square nut 56. During assembly, spring 53 is fitted over bolt 55 and the free end of bolt 55 is inserted through both brake shoe actuation arms 50 and 51. Nut 56 is then threaded onto the lower free end of bolt 55 and tightened to provide braking engagement between brake linings 60 and 61 and drum 40. Square nut 56 is held from rotating by two flanges 58. Bolt 55 is tightened so that spring 53 urges brake actuation arms 50 and 51 together, thereby providing sufficient braking force to drum 40. Bolt 55 should be tightened to provide adequate braking at drum 40 while providing a sufficient length of uncompressed spring 53 to permit the separation of arms 50 and 51 for the release of the brake, as discussed below.

The apparatus of FIG. 2 also includes a solenoid 65 which is attached by bolts 64 to the same substrate as are brake shoe pivot shafts 45 and 48. The armature 66 of solenoid 65 is connected by a linkage 67 to a connection 87 of a pivotable brake control lever 69. The pivotable lever 69 is pivotably attached to the substrate at a pivot point 71. A brake actuating de-actuating stud 73 is attached to pivotable lever 69 at the distant end from pivot point 71. In FIGS. 2 and 3, linkage 67 is a spring attached at one end to armature 66 and at the other to connection 87 of the pivotable lever 69. The spring linkage 67 must be capable of providing sufficient rotational force to pivotable lever 69 to drive stud 73 between arms 50 and 51 when solenoid 65 is energized. Linkage 67 could, in other embodiments, be a solid connecting member, however, the use of spring linkage simplifies assembly and maintenance by making the exact position of solenoid 65 less critical.

FIG. 4 shows a bottom (end) elevational view of pivotable lever 69. Pivotable lever 69 comprises a pair of side flanges 75 connected by a flat wall 76. Flat wall 76 includes a slot 78 (FIG. 5) along its center line through which connection to actuating stud 73 is achieved. The stud 73 is shown in perspective in FIG. 8, and its attachment to pivotable lever 69 is shown in FIGS. 6 and 7. Stud 73 is generally shaped as the frustum of an approximately 60° right circular cone having an apex 80 and a base 81. Apex 80 has a diameter which is less than the separation of the brake actuation arms 50 and 51 when brake shoes 42 and 44 are engaged with drum 40. The base 81 has a substantially greater diameter than the braking separation of arms 50 and 51. Advantageously, the base 81 is formed into a hexagonal shape comprising three pairs of substantially parallel opposed surfaces. A hole is drilled and tapped along the major axis of stud 73 from the base 81 toward, but short of, the apex 80.

During assembly, two flat surfaces of the hexagonal base 81 are aligned substantially with flanges 75 and the stud 73 is pressed against bottom wall 76 of the pivotable lever 69. A bolt 83 is then placed through slot 78 of wall 76 and screwed into the tapped hole in stud 73. Bolt 83 is tightened into stud 73 leaving approximately 4 to 5 thousandths of an inch of clearance between the head of bolt 83 and the outer surface of wall 76. The separation between the head of bolt 83 and the wall 76 is exaggerated in FIG. 7 for ease of visualization. Bolt 83 slidably connects stud 73 to pivotable lever 69 and permits free travel of stud 73 over a length defined by slot 78. From FIGS. 6 and 7, it can be seen that not only do flanges 75 provide additional structural support for pivotable lever 69, but they also keep stud 73 from rotating during the insertion of bolt 83.

After the attachment of stud 73 to pivotable lever 69, that lever is mounted at the pivot point 71 (FIG. 2) and rotated into the position substantially as shown in FIG. 2. In this position, stud 73 is in loose contact with ends 52 and 54 of arms 50 and 51, and its apex is between those arms. After the placement of pivotable lever 69, linkage 67 is attached to pivotable lever 69 at the connection 87. When pivotable lever 69 is in place, a set screw 89 is tightened to limit the counterclockwise rotation of pivotable lever 69 so that the apex 80 of stud 73 cannot be entirely withdrawn from its position between arms 50 and 51.

FIG. 2 shows the brake control apparatus when the motor is not energized and braking is applied to brake drum 40 by the linings of brake shoes 42 and 44. When the motor is to be started, electrical power is applied to the motor and to solenoid 65 via conductors 90. Solenoid 65 responds to the applied power by pulling on linkage 67 (movement to the left in FIG. 3) thereby rotating pivotable lever 69 clockwise. As pivotable lever 69 rotates in the clockwise direction, stud 73 is driven between the rounded ends 52 and 54 of arms 50 and 51. The force applied by stud 73 to arms 50 and 51 causes them to separate and thereby release the engagement of brake linings 60 and 61 with brake drum 40. FIG. 3 represents the braking apparatus operating in the released mode. The apparatus will stay in the released mode of FIG. 3 until power is withdrawn from the solenoid 65. When electrical power is withdrawn, solenoid 65 releases linkage 67 thereby permitting the counterclockwise rotation of pivotable member 69. With the release of pivotable member 69, the stud 73 no longer applies separating force to arms 50 and 51, and the force of spring 53 urges the arms together again, engaging brake shoes 42 and 44 with drum 40. Such engagement stops rotational motion of the motor attached to drum 40. The force applied by spring 53, without the counteracting force from solenoid 65, moves stud 73 to the right, back to the position shown in FIG. 2.

The slidable connection of stud 73 to pivotable lever 69 is advantageous for the assembly and maintenance of the disclosed brake control apparatus. Assembly of the unit is greatly simplified since no assembly time adjustments are required of either the position of stud 73 or the brake actuation arms 50 and 51. The stud 73 will self-center itself between arms 50 and 51 by sliding along slot 78. As parts wear and the relative positions of parts change, the stud 73 is free to slide along slot 78 and re-center itself between the actuation arms 50 and 51 when it is driven therebetween.

While the principles of the invention have been described above in connection with specific apparatus and applications, it is to be understood that this description is made by way of example and not as a limitation on the scope of the claims of this invention. For example, the moveable brake release mounting slidably connected to stud 73 is a pivot arm 69 in the Preferred Embodiment. The brake release mounting for stud 73 could also be a linearly moving assembly which is driven between arms 50 and 51. Also, the stud 73 in the Preferred Embodiment is the frustum of a right circular cone. Other shapes of studs, such as the priorly known wedge, could be used, however, the cone shape provides particular advantages. As a conical stud 73 wears, it will wear at two points around its lateral surface. Should the wear be excessive, the stud can be disconnected, rotated to another pair of parallel surfaces and replaced in slidable connection with pivotable lever 69.

What Is Claimed Is:

1. A braking device for applying braking forces to slow and stop movement of a garage door, the operation of which is controlled by a garage door operator comprising a rotatable member, said braking device comprising:
   a pair of brake shoes each carrying a brake lining for engagement with said rotatable member of said operator, each of said brake shoes comprising a pivotally mounted first end and a second end;
   brake closure means for urging said second ends of said brake shoes toward one another, thereby engaging said brake linings with said rotatable member, said second ends being spaced apart when said brake linings are engaged with said rotatable member;
   a movable brake release mounting;
   a brake shoe position controlling stud having an apex narrower than the space between said spaced apart second ends and having a base wider than the space between said spaced apart second ends;
   connection means for slidably connecting the base of said stud to said brake release mounting; and
   means for moving said brake release mounting toward said spaced apart second ends of said brake shoes thereby forcing said brake release stud between said spaced apart second ends, releasing the engagement of said rotatable member by said brake linings, said brake release stud sliding along said brake release mounting means, upon such forcing, to equalize the forces applied by said brake release stud to both of said second ends of said brake shoes.

2. The braking device of claim 1 wherein said brake release mounting has disposed therein an elongate aperture of a predetermined length and said connection means comprises means for slidably attaching said stud to said brake release mounting through said aperture to permit sliding movement of said stud along the length of said slot.

3. The braking device of claim 1 wherein said brake release mounting comprises a pivotally mounted brake control member and means for pivoting said brake control member.

4. The combination of claim 3 wherein said means for pivoting said brake control member comprises an electrically energizable solenoid linked thereto.

5. The combination of claim 1 wherein said stud has an outside working surface in the general form of a frustum of a right circular cone.

6. An arrangement for applying separating forces to a pair of spaced apart brake control arms, said arrangement comprising:
   a brake controlling stud having a substantially conical shape with a base larger than the space between said brake control arms and an apex smaller than the space between said brake control arms;
   means for moving said apex of said stud between said brake control arms to thereby apply separation forces to said brake control arms with the outside surface of said stud; and
   a sliding connection between the base of said stud and said moving means, said sliding connection permitting movement of said stud along said moving means such that unequal forces applied to said stud by said spaced-apart brake control arms result in sliding movement of said stud into a centralized relationship with said brake control arms for the application of substantially equal separation forces thereto.

7. The arrangement of claim 6 wherein said moving means comprises a brake release mounting having disposed therein an elongate aperture of a predetermined length and said sliding connection comprises means for slidably attaching said stud to said brake release mounting through said aperture to permit sliding movement of said stud along the length of said aperture.

8. The arrangement of claim 7 wherein said brake release mounting comprises a pivotably mounted brake control member and means for pivoting said brake control member.

9. The arrangement of claim 8 wherein said means for pivoting said brake control member comprises an electrically energizable solenoid linked by a spring to said brake control member.

* * * * *

UNITED STATES PATENT AND TRADEMARK OFFICE
CERTIFICATE OF CORRECTION

PATENT NO. : 5,090,522
DATED : February 25, 1992
INVENTOR(S) : Korff It is certified that error appears in the above-identified patent and that said Letters Patent is hereby corrected as shown below:

ON THE TITLE PAGE:

For the United Kingdom reference, change "563776" to --503776--.

In the abstract, line 7, change "mechanisms" to --mechanism--.

In column 2, line 2, change "us" to --use--.
In column 2, line 64, change "n" to --non-braking--.
In column 2, line 66, insert --of the-- after "lever".

Signed and Sealed this

Fifteenth Day of February, 1994

Attest:

BRUCE LEHMAN

Attesting Officer     Commissioner of Patents and Trademarks